United States Patent
Hu

(10) Patent No.: US 11,447,102 B1
(45) Date of Patent: Sep. 20, 2022

(54) ADAPTIVE ADJUSTMENT WINDSHIELD WIPER

(71) Applicant: Danyang Hurst Auto Parts Co., Ltd., Zhenjiang (CN)

(72) Inventor: Kongjin Hu, Zhenjiang (CN)

(73) Assignee: DANYANG HURST AUTO PARTS CO., LTD., Zhenjiang (CN)

( * ) Notice: Subject to any disclaimer, the term of this patent is extended or adjusted under 35 U.S.C. 154(b) by 0 days.

(21) Appl. No.: 17/535,738

(22) Filed: Nov. 26, 2021

(30) Foreign Application Priority Data

Jun. 24, 2021 (CN) .......................... 202110706324.7

(51) Int. Cl.
*B60S 1/38* (2006.01)
(52) U.S. Cl.
CPC ..... *B60S 1/3801* (2013.01); *B60S 2001/3813* (2013.01); *B60S 2001/3815* (2013.01)
(58) Field of Classification Search
CPC ............ B60S 1/3801; B60S 2001/3813; B60S 2001/3815
USPC .............................. 15/250.46, 250.43, 250.44
See application file for complete search history.

(56) References Cited

U.S. PATENT DOCUMENTS

| | | | | |
|---|---|---|---|---|
| 2,876,482 A * | 3/1959 | Oishei | ................. | B60S 1/3801 15/250.4 |
| 4,287,634 A * | 9/1981 | Speth | ................. | B60S 1/3801 15/250.33 |
| 7,028,368 B2 * | 4/2006 | Lee | ................. | B60S 1/381 15/250.43 |
| 8,261,405 B2 * | 9/2012 | Kim | ................. | B60S 1/3801 15/250.44 |
| 8,359,701 B2 * | 1/2013 | De Block | ................. | B60S 1/3881 15/250.43 |
| 2009/0158547 A1 * | 6/2009 | Kim | ................. | B60S 1/3848 15/250.351 |

FOREIGN PATENT DOCUMENTS

EP 2230139 * 9/2010

* cited by examiner

*Primary Examiner* — Gary K. Graham
(74) *Attorney, Agent, or Firm* — McClure, Qualey & Rodack, LLP

(57) ABSTRACT

An adaptive adjustment windshield wiper, comprising a wiper rubber body and an adaptive adjustment mechanism. The adaptive adjustment mechanism comprises an adjusting elastic piece, balance connectors and fixators; the adjusting elastic piece has elastic modulus, the balance connectors are arranged between the adjusting elastic piece and the wiper rubber body; elastic supporting parts are arranged on both sides of the balance connector, and the fixator is flexibly installed between supporting parts of the balance connector. The adaptive adjustment mechanism is installed on the wiper rubber body; elastic pressure of the adjusting elastic piece for the adaptive adjustment mechanism is transferred to the wiper rubber body through the balance connectors so that the wiper rubber body is bent to fit surface of the front windshield; the balance connectors flexibly connected with the adjusting elastic piece through the fixators can adjust balance during move to ensure wiping effects of the windshield wiper.

4 Claims, 3 Drawing Sheets

ADAPTIVE ADJUSTMENT WINDSHIELD WIPER

TECHNICAL FIELD

The invention relates to the technical field of automobile parts, in particular to an adaptive adjustment windshield wiper.

BACKGROUND ART

The windshield wiper is an indispensable component of the vehicle, and its technical level and quality can reflect the technical and quality level of the entire vehicle to a large extent, so the importance of windshield wiper system component is self-evident.

The windshield wiper widely used in the prior art has the following defects in the daily use: the wiper rubbers for most of the previous windshield wipers are fixed and installed on the support bodies; although the support body can firmly clamp the wiper rubber, the wiper rubber is fixed firmly on the support body, that is to say, the wiper rubber is non-deformable on the support body. After use for a long time, the wiper rubber is deformed under deformation stress and cannot achieve self-balance adjustment, that is, the wiper rubber cannot fit well with the curved windshield surface, so that local area of the windshield will not be completely wiped. Therefore, the users need to replace the windshield wipers frequently, which increases the daily use cost of vehicles.

SUMMARY OF THE INVENTION

Aiming at the defects in the prior art, the invention provides an adaptive adjustment windshield wiper, which can make adaptive adjustment according to the radian of the front windshield to ensure that the wiper rubber stably fits the front windshield of the vehicle.

The invention adopts the following technical proposal: an adaptive adjustment windshield wiper comprises a wiper rubber body and an adaptive adjustment mechanism, wherein the wiper rubber body is flexible, the adaptive adjustment mechanism comprises an adjusting elastic piece, a plurality of balance connectors and fixators; the adjusting elastic piece has elastic modulus, is arranged above the wiper rubber body along the length direction of the wiper rubber body; the balance connectors are arranged at intervals between the adjusting elastic piece and the wiper rubber body, elastic supporting parts are arranged on both sides of the balance connector, and the two supporting parts are connected with the wiper rubber body by sliding fit, the fixator is flexibly installed between the two supporting parts of the balance connectors, and the upper end of the fixator is flexibly connected with the adjusting elastic piece.

In the technical proposal, the adaptive adjustment mechanism is installed on the flexible wiper rubber body so that the radian of the wiper rubber body can be adjusted according to the radian of front windshield; the adjusting elastic piece above the wiper rubber body has elastic modulus, the elastic pressure of the adjusting elastic piece is transferred to the wiper rubber body through the balance connectors, the supporting part on both sides of the balance connector adopts sliding fit with the wiper rubber body, the pressure applied by the supporting parts on both sides of each balance connector to the wiper rubber body ensures that the wiper rubber body is bent to fit surface of the front windshield, and the balance connectors are flexibly connected with the adjusting elastic piece through the fixator, so that the wiper rubber has high flexibility and can automatically adjust the balance in the moving process, avoiding large noise in the rotation of the wiper rubber body. Because of good fit between the wiper rubber body with the front windshield, the wiping effect of the windshield wiper can be ensured.

Further, the fixator comprises a fixing block flexibly installed inside the balance connector, a slot for the wiper rubber body to pass through is arranged at the lower end of the fixing block, rotary mounting parts (412) adopting rotating fit with the balance connectors are arranged on both outer sides of the fixing block corresponding to the slot, a mounting shaft is arranged at the upper end of the fixing block, and the upper end of the fixing block is flexibly connected with adjusting elastic piece.

Further, a mounting groove for installing the fixing block is arranged between the two supporting parts of the balance connectors, and rotating bayonets adopting rotating fit with the rotary mounting parts (412) are arranged on both sides of the mounting groove.

Further, the mounting shaft is flexibly connected with the fixing block, a lower anti-off part clipped into the shaft hole at the upper end of the fixing block is arranged at the lower end of the mounting shaft, and an upper anti-off part flexibly clipped into the adjusting elastic piece is arranged at the upper end of the mounting shaft (420).

Further, a plurality of connecting holes are arranged at intervals on the adjusting elastic piece, and the upper anti-off part of the mounting shaft is flexibly clipped into the connecting hole.

Further, a sliding fit part is arranged at the end of the supporting part, sliding clip bulges arranged oppositely are arranged on both sides in the length direction of the sliding fit part corresponding to the wiper rubber body, and the sliding clip bulges adopts the sliding fit with the sliding grooves arranged on both sides in the length direction of the wiper rubber body.

Further, the adaptive adjustment windshield wiper also comprises a pivoted arm connecting mechanism, wherein the pivoted arm connecting mechanism comprises a gripper, which is located above the adjusting elastic piece and is fixedly connected with the adjusting elastic piece, a shielding cover arranged along the length direction of the adjusting elastic piece is arranged at both ends of the gripper; the shielding cover is covered on the adjusting elastic piece.

Further, a fixing cover is also buckled on the gripper.

Further, a detachable protective connector is arranged at the end of the shielding cover far away from the gripper.

The invention has the following beneficial effects: in the adaptive adjustment windshield wiper provided by the invention, the adaptive adjustment mechanism is installed on the wiper rubber body, the elastic pressure of the adjusting elastic piece for the adaptive adjustment mechanism is transferred to the wiper rubber body through the balance connectors, the pressure applied by the supporting parts on both sides of each balance connector to the wiper rubber body ensures that the wiper rubber body is bent to fit the surface of the front windshield, and the balance connectors are flexibly connected with the adjusting elastic piece through the fixator, and can automatically adjust the balance in the moving process. Because of good fit between the wiper rubber body with the front windshield, the wiping effect of the windshield wiper can be ensured; thereby, the adaptive adjustment windshield wiper has high practical value and promotion value.

BRIEF DESCRIPTION OF THE DRAWINGS

In order to more clearly describe the embodiments of the invention or the technical proposal of the prior art, the following is a brief introduction to the drawings required for the description of embodiments or prior art. In all drawings, similar components or parts are generally identified by similar reference signs. The components or parts in the drawings are not necessarily drawn to the actual scale.

Figure 1:
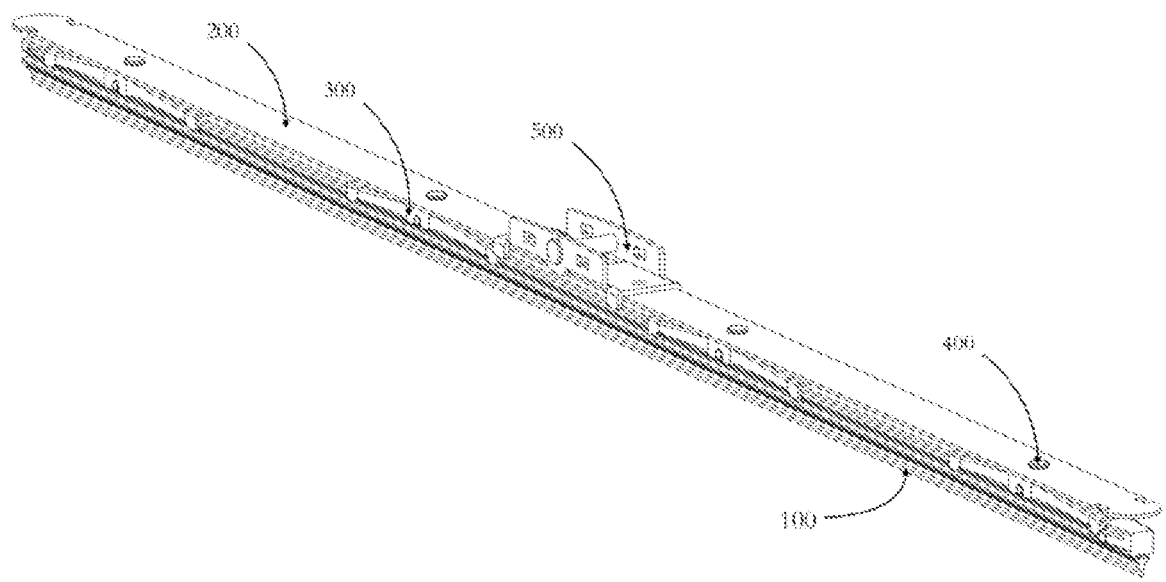
FIG. 1 is an installation diagram for the adaptive adjustment mechanism of the adaptive adjustment windshield wiper provided in Embodiment 1 of the invention.

Reference signs: wiper rubber body 100, adjusting elastic piece 200, balance connector 300, fixator 400, supporting part 310, rotating bayonet 311, sliding fit part 320, sliding clip bulge 321, fixing block 410, slot 411, rotary mounting part 412, mounting shaft 420, upper anti-off part 421, lower anti-off part 422, gripper 500, shielding cover 600, protective connector 700, fixing cover 800.

DETAILED DESCRIPTION OF PREFERRED EMBODIMENTS

The embodiments of the technical proposal of the present invention are described in detail below according to the drawings. The following embodiments are used only to more clearly illustrate the technical proposal of the invention and are therefore only examples, and shall not be used to restrict the scope of protection of the invention.

It should be noted that, unless otherwise stated, the technical or scientific terms used in the application shall be in a sense normally understood by technicians in the field of the invention.

Embodiment 1

Figure 2:
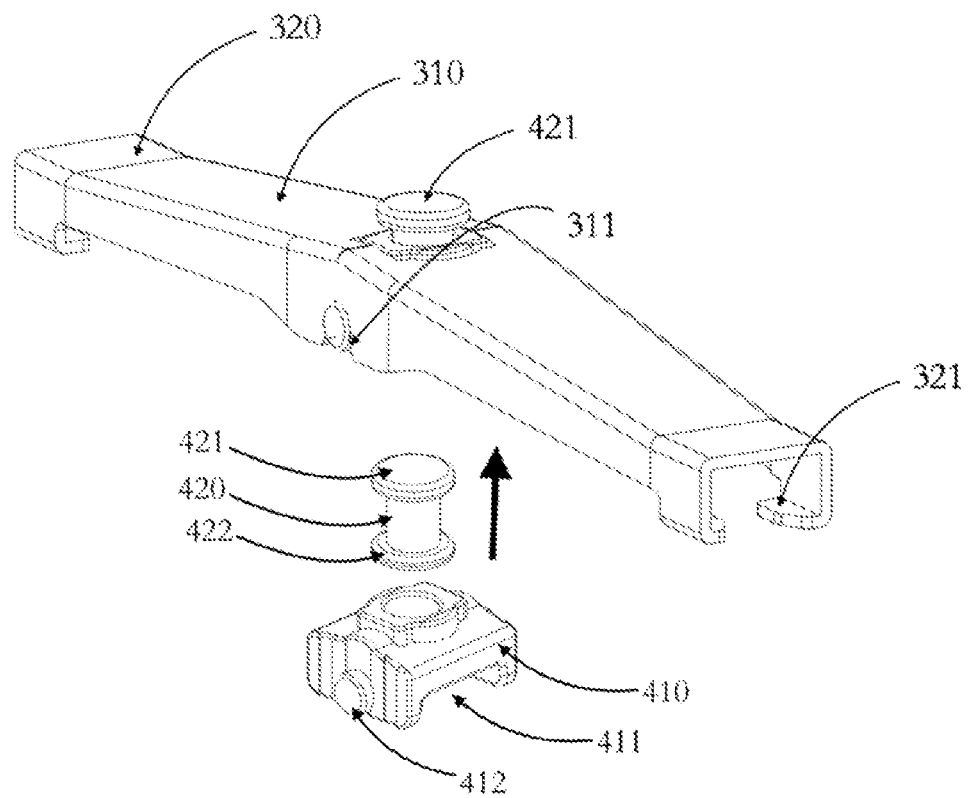
FIG. 2 is installation diagram 1 for the balance connectors of the adaptive adjustment windshield wiper provided in Embodiment 1 of the invention.

As shown in FIG. 1 and FIG. 2, the embodiment of the invention provides an adaptive adjustment wiper, which comprises a wiper rubber body 100 and an adaptive adjustment mechanism, wherein the wiper rubber body 100 is flexible and adopts the structure of the prior art, which will not be described herein; the adaptive adjustment mechanism is used to apply elastic pressure to the wiper rubber body 100 to ensure that the wiper rubber body 100 adapts to the curved front windshield of the vehicle. Specifically, the adaptive adjustment mechanism provided in the embodiment comprises an adjusting elastic piece 200, a plurality of balance connectors 300 and fixators 400; the adjusting elastic piece 200 has elastic modulus, is arranged above the wiper rubber body 100 along the length direction of the wiper rubber body 100; the balance connectors 300 are arranged at intervals between the adjusting elastic piece 200 and the wiper rubber body 100, elastic supporting parts 310 are arranged on both sides of the balance connector 300, and the two supporting parts 310 are connected with the wiper rubber body 100 by sliding fit, the fixator 400 is flexibly installed between the two supporting parts 310 of the balance connectors 300, and the upper end of the fixator 400 is flexibly connected with the adjusting elastic piece 200.

As shown in FIG. 1 and FIG. 2, in the embodiment, the flexible wiper rubber body 100 can adjust to the position of fit with the surface of the front windshield under the elastic pressure applied by the adaptive adjustment mechanism according to the radian of the front windshield through the above arrangement; the adjusting elastic piece 200 for applying the elastic pressure has elastic modulus; the adjusting elastic piece 200 is arranged above the wiper rubber body 100, so that the elastic pressure of the adjusting elastic piece 200 is transferred to the wiper rubber body 100 through the balance connectors 300, the supporting part 310 on both sides of the balance connector 300 adopts sliding fit with the wiper rubber body 100, the pressure applied by the supporting parts 310 on both sides of each balance connector 300 to the wiper rubber body 100 ensures that the wiper rubber body 100 is bent to fit the surface of the front windshield, and the balance connectors 300 are flexibly connected with the adjusting elastic piece 200 through the fixator 400, so that the wiper rubber has high flexibility and can automatically adjust the balance in the moving process, avoiding large noise in the rotation of the wiper rubber body 100. Because of good fit between the wiper rubber body 100 with the front windshield, the wiping effect of the windshield wiper can be ensured.

As shown in FIG. 1 and FIG. 2, in the embodiment, the adjusting elastic piece 200 and the balance connectors 300 are flexibly connected through the fixator 400 as previously mentioned. For flexible connection, the fixator 400 in the embodiment comprises a fixing block 410 flexibly installed inside the balance connector 300, a slot 411 for the wiper rubber body 100 to pass through is arranged at the lower end of the fixing block 410, rotary mounting parts 412 adopting rotating fit with the balance connectors 300 are arranged on both outer sides of the fixing block 410 corresponding to the slot 411, a mounting shaft 420 is arranged at the upper end of the fixing block 410, and the upper end of mounting shaft 420 is flexibly connected with adjusting elastic piece 200; in addition, a mounting groove for installing the fixing block 410 is arranged between the two supporting parts 310 of the balance connectors 300, and rotating bayonets 311 adopting rotating fit with the rotary mounting parts 412 are arranged on both sides of the mounting groove. So, the fixing block 410 of the fixator 400 can be flexibly installed in the mounting groove, the wiper rubber body 100 located below the balance connectors 300 can pass through the slot 411, and the rotary mounting parts 412 on both sides of the fixing block 410 can be clipped into the rotating bayonet 311, thereby realizing the flexible connection between the fixator 400 and the balance connectors 300, ensuring that the fixing block 410 of the fixator 400 can rotate around the rotary mounting part 412 in the mounting groove of the balance connectors 300 and achieving adaptive rotatory adjustment; the mounting shaft 420 located at the upper end of the fixing block 410 can be clipped into the adjusting elastic piece 200 to realize the flexible connection between the fixator 400 and the adjusting elastic piece 200, ensure that the elastic force of the adjusting elastic piece 200 can be transferred to the wiper rubber body 100 through the balance connectors 300 and automatically adjust the balance during rotation.

As shown in FIG. 2, in the embodiment, the mounting shaft 420 is flexibly connected with the fixing block 410; for flexible connection, the lower anti-off part 422 clipped into the shaft hole at the upper end of the fixing block 410 is arranged at the lower end of the mounting shaft 420, and the upper anti-off part 421 flexibly clipped into the adjusting elastic piece 200 is arranged at the upper end of the mounting shaft 420. So, one end of the mounting shaft 420 is flexibly connected with the adjusting elastic piece 200 through the upper anti-off part 421, and the other end thereof is flexibly connected with the fixing block 410 through the lower anti-off part 422, thereby ensuring the installation flexibility of the balance connectors 300. In addition, in the embodiment, a plurality of connecting holes are arranged at intervals on the adjusting elastic piece 200, and the upper anti-off part 421 of the mounting shaft 420 is flexibly clipped into the connecting hole; the upper anti-off part 421 of the mounting shaft 420 can be clipped into the connecting hole to improve installation stability.

Figure 3:
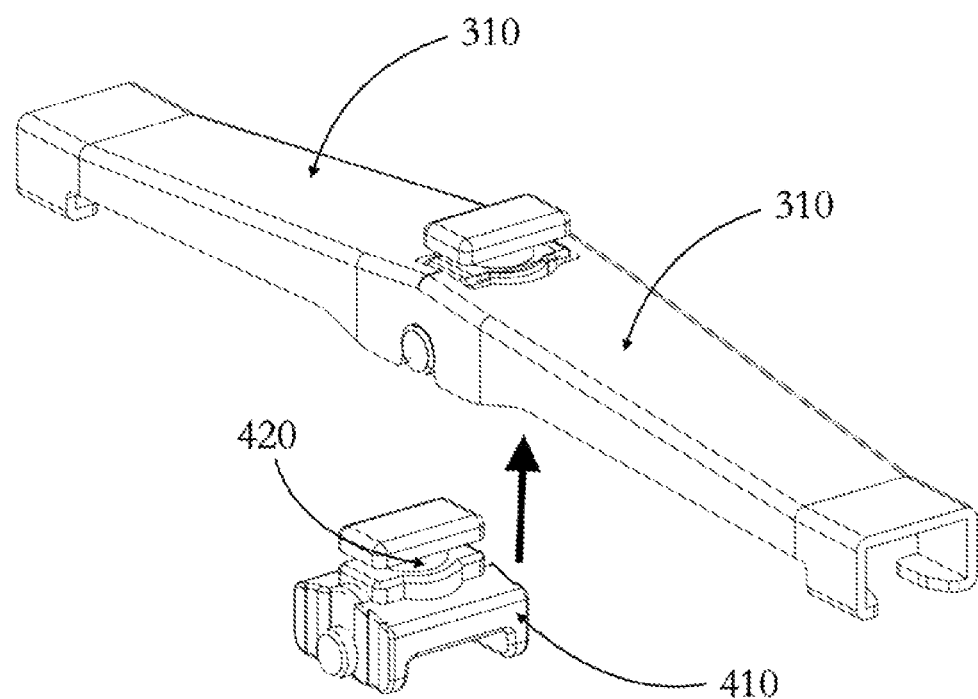
FIG. 3 is installation diagram 2 for the balance connectors of the adaptive adjustment windshield wiper provided in Embodiment 1 of the invention.

As shown in FIG. 3, in some embodiments, the lower end of the mounting shaft 420 is fixed with the fixing block 410 to form an integrated structure, and the upper end of the mounting shaft 420 can be still flexibly connected with the adjusting elastic piece 200 through the upper anti-off part 421.

Figure 4:
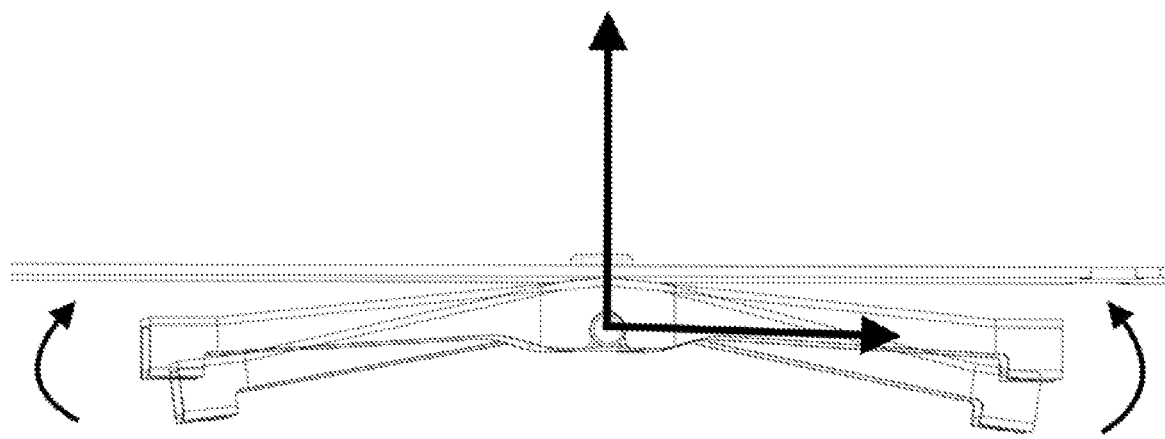
FIG. 4 is an adjustment diagram for the balance connectors of the adaptive adjustment windshield wiper provided in Embodiment 1 of the invention.

As shown in FIG. 4, the elastic pressure applied by the adjusting elastic piece 200 are applied to the wiper rubber body 100 through the supporting part 310; if the unfolding breadth of the supporting part 310 is larger at both ends, the pressure of the adjusting elastic piece 200 will be higher; in order to ensure that the wiper rubber body 100 fits with the front windshield, the sliding fit part 320 is arranged at the end of the supporting part 310 in the embodiment, sliding clip bulges 321 arranged oppositely are arranged on both sides in the length direction of the sliding fit part 320 corresponding to the wiper rubber body 100, and the sliding clip bulges 321 adopts the sliding fit with the sliding grooves arranged on both sides in the length direction of the wiper rubber body 100. So, the sliding fit part 320 at the end of the supporting part 310 can realize the sliding fit with the sliding grooves of the wipe strip through the sliding clip bulges, and the sliding fit part 320 can slide along the wiper rubber body 100 according to the pressure to achieve adaptive adjustment.

Embodiment 2

Figure 5:
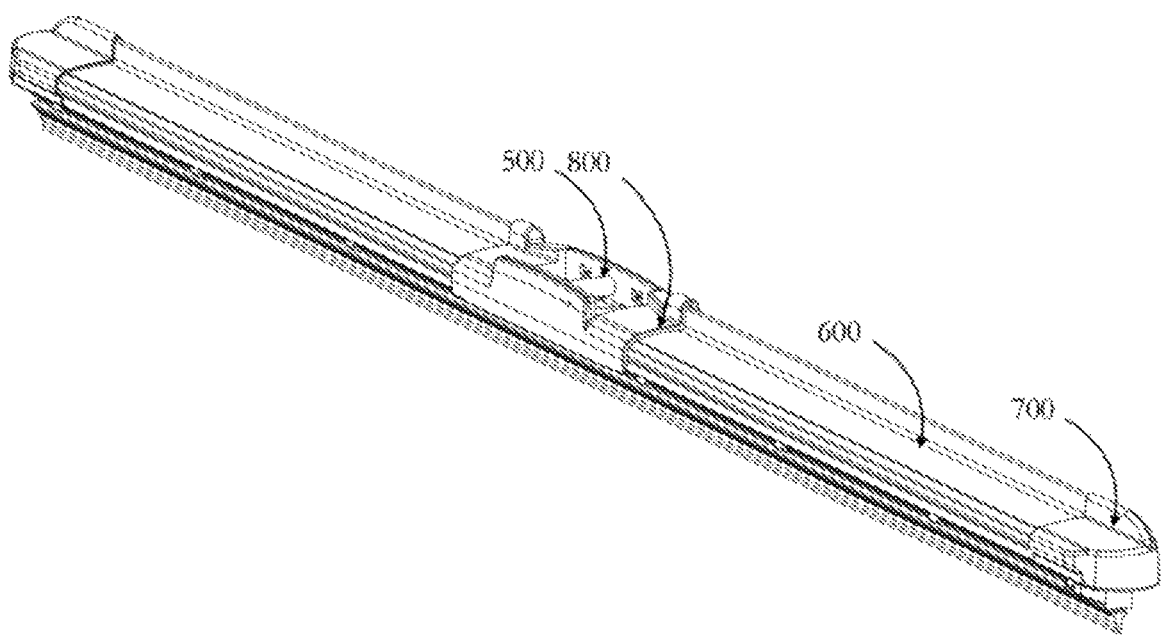
FIG. 5 is a stereogram for the adaptive adjustment windshield wiper provided in Embodiment 2 of the invention.

As shown in FIG. 5, the embodiment provides a pivoted arm connecting mechanism, wherein the pivoted arm connecting mechanism comprises a gripper 500, which is located above the adjusting elastic piece 200 and is fixedly connected with the adjusting elastic piece 200, a shielding cover 600 arranged along the length direction of the adjusting elastic piece 200 is arranged at both ends of the gripper 500; the shielding cover 600 is covered on the adjusting elastic piece 200. Therefore, when the device is installed, the gripper 500 can be pivotably connected with the pivoted arm of the windshield wiper, the shielding cover 600 located at both ends of the gripper 500 can be covered on the adjusting elastic piece 200 to protect the adjusting elastic piece 200 and avoid damage to the adjusting elastic piece 200. In addition, a fixing cover 800 is buckled on the gripper 500 to protect the gripper 500; in the embodiment, a detachable protective connector 700 is arranged at the end of the shielding cover 600 far away from the gripper 500 to protect both ends of the windshield wiper and avoid damage to the adjusting elastic piece 200, the wiper rubber body 100, etc.

Finally, it should be noted that the above embodiments are only used to illustrate the technical proposal of the invention, but not to limit it. Notwithstanding the detailed description of the invention with reference to the foregoing embodiments, the ordinary technicians in the field should understand that they may modify the technical proposal recorded in the foregoing embodiments or make equivalent substitution of some or all of the technical characteristics thereof. Such modification or substitution shall not separate the essence of the corresponding technical proposal from the scope of the technical proposal of each embodiment of the invention, and shall be covered by the claims and specification of the invention.

The invention claimed is:

1. An adaptive adjustment windshield wiper, comprising a wiper rubber body (100) which is flexible, and characterized in that the adaptive adjustment windshield wiper also comprises an adjusting elastic piece (200), a plurality of balance connectors (300) and fixators (400);

the adjusting elastic piece (200) has elastic modulus, and is arranged above the wiper rubber body (100) along a length direction of the wiper rubber body (100);

the plurality of balance connectors (300) are arranged at intervals between the adjusting elastic piece (200) and the wiper rubber body (100); elastic supporting parts (310) are arranged on both sides of the plurality of balance connectors (300), and the elastic supporting parts (310) are connected with the wiper rubber body (100) by sliding fit; the fixators (400) are flexibly installed between the elastic supporting parts (310) of the plurality of balance connectors (300), and upper ends of the fixators (400) are flexibly connected with the adjusting elastic piece (200);

wherein the fixators (400) comprise fixing blocks (410) flexibly installed inside the plurality of balance connectors (300), a slot (411) for the wiper rubber body (100) to pass through is arranged at lower ends of the fixing blocks (410); rotary mounting parts (412) adopting rotating fit with the plurality of balance connectors (300) are arranged on both outer sides of the fixing blocks (410) corresponding to the slot (411); mounting shafts (420) are arranged at upper ends of the fixing blocks (410), and upper ends of the mounting shafts (420) are flexibly connected with the adjusting elastic piece (200).

2. The adaptive adjustment windshield wiper according to claim 1, characterized in that mounting grooves for installing the fixing block (410) are arranged between the elastic supporting parts (310) of the plurality of balance connectors (300), and rotating bayonets (311) adopting rotating fit with the rotary mounting parts (412) are arranged on both sides of the mounting grooves.

3. The adaptive adjustment windshield wiper according to claim 1, characterized in that the mounting shafts (420) are flexibly connected with the fixing blocks (410), lower anti-off parts (422) clipped into shaft holes at upper ends of the fixing blocks (410) are arranged at the lower ends of the mounting shafts (420), and upper anti-off parts (421) flexibly clipped into the adjusting elastic piece (200) are arranged at the upper ends of the mounting shafts (420).

4. The adaptive adjustment windshield wiper according to claim 3, characterized in that a plurality of connecting holes are arranged at intervals on the adjusting elastic piece (200), and the upper anti-off parts (421) of the mounting shafts (420) are flexibly clipped into the plurality of connecting holes.

\* \* \* \* \*